US012028460B2

(12) United States Patent
Wang et al.

(10) Patent No.: US 12,028,460 B2
(45) Date of Patent: Jul. 2, 2024

(54) VERIFYING USER INTERACTIONS ON A CONTENT PLATFORM

(71) Applicant: Google LLC, Mountain View, CA (US)

(72) Inventors: Gang Wang, Jersey City, NJ (US); Sudhi P Herle, Menlo Park, CA (US); Giles Dominic Hogben, Los Altos Hills, CA (US); Alex Daniel Jacobson, Mountain View, CA (US); Michael Wright, London (GB); Nicholas N. Kralevich, IV, Sunnyvale, CA (US); Bram Bonné, Zurich (CH)

(73) Assignee: Google LLC, Mountain View, CA (US)

( * ) Notice: Subject to any disclaimer, the term of this patent is extended or adjusted under 35 U.S.C. 154(b) by 718 days.

(21) Appl. No.: 17/269,769

(22) PCT Filed: Feb. 6, 2020

(86) PCT No.: PCT/US2020/016998
§ 371 (c)(1),
(2) Date: Feb. 19, 2021

(87) PCT Pub. No.: WO2021/158227
PCT Pub. Date: Aug. 12, 2021

(65) Prior Publication Data
US 2022/0123944 A1    Apr. 21, 2022

(51) Int. Cl.
*H04L 9/32* (2006.01)
*G06F 21/31* (2013.01)

(52) U.S. Cl.
CPC ............ *H04L 9/3242* (2013.01); *G06F 21/31* (2013.01); *H04L 9/3213* (2013.01); *G06F 2221/2133* (2013.01)

(58) Field of Classification Search
None
See application file for complete search history.

(56) References Cited

U.S. PATENT DOCUMENTS

| 10,003,583 B2 | 6/2018 | Dare et al. |
| 11,882,327 B2 | 1/2024 | Wang et al. |

(Continued)

FOREIGN PATENT DOCUMENTS

| CN | 101106455 | 1/2008 |
| CN | 107342998 | 11/2017 |

(Continued)

OTHER PUBLICATIONS

Office Action in Australian Appln. No. 2020260457, dated Sep. 3, 2021, 6 pages.

(Continued)

*Primary Examiner* — Joseph P Hirl
*Assistant Examiner* — Hassan Saadoun
(74) *Attorney, Agent, or Firm* — Fish & Richardson P.C.

(57) ABSTRACT

Methods, systems, and apparatus, including computer programs encoded on a computer storage medium, to verify whether an interaction with a particular content displayed on a content platform is an interaction by an actual human user. A request to generate a click verification token can be received from a first application executing on a client device. The request can include data for a first set of parameters for a first interaction and a first message authentication code (MAC) set. If the first MAC set matches a second MAC set, which is generated using some of the data included in the request, the click verification token can be generated. The click verification token can be provided to the first application, which in turn can provide this token to a content verification system. The content verification system can use this token to verify whether the first interaction is an actual human user interaction.

20 Claims, 3 Drawing Sheets

(56) References Cited

U.S. PATENT DOCUMENTS

| | | | |
|---|---|---|---|
| 2002/0138735 | A1 | 9/2002 | Felt et al. |
| 2005/0278235 | A1 | 12/2005 | Dietrich |
| 2005/0278253 | A1* | 12/2005 | Meek ................. G06F 21/31 705/50 |
| 2009/0292924 | A1* | 11/2009 | Johnson ............. G06F 21/316 713/176 |
| 2010/0312653 | A1 | 12/2010 | Carpenter et al. |
| 2011/0123062 | A1 | 5/2011 | Hilu et al. |
| 2011/0161145 | A1 | 6/2011 | Ayeshwarya |
| 2012/0106735 | A1 | 5/2012 | Fukuda |
| 2014/0282696 | A1* | 9/2014 | Mao .................. H04N 21/2547 725/32 |
| 2015/0150109 | A1* | 5/2015 | Bocanegra ........ H04L 63/0807 726/9 |
| 2015/0295930 | A1* | 10/2015 | Dixon ............... H04L 63/0807 713/181 |
| 2016/0285873 | A1 | 9/2016 | Lambert et al. |
| 2017/0142080 | A1 | 5/2017 | Hill |
| 2019/0012480 | A1 | 1/2019 | Thorwirth |
| 2019/0028892 | A1* | 1/2019 | Henry ............... H04W 12/069 |

FOREIGN PATENT DOCUMENTS

| | | |
|---|---|---|
| CN | 110291754 | 9/2019 |
| JP | H11-164132 | 6/1999 |
| JP | 2011-164132 | 8/2011 |
| KR | 10-2004-0055776 | 6/2004 |
| KR | 10-2019-0104401 | 9/2019 |
| WO | WO 2001057783 | 8/2001 |
| WO | WO 2018/160863 | 9/2018 |
| WO | WO 2018208997 | 11/2018 |

OTHER PUBLICATIONS

Notice of Allowance in Japanese Appln No. 2020-566224, dated Apr. 18, 2022, 5 pages (with English translation).

Office Action in Chinese Appln. No. 202080003023.1, dated Mar. 15, 2022, 11 pages (with English translation).

Office Action in Japanese Appln No. 2020-566231, dated Apr. 18, 2022, 6 pages (with English translation).

Notice of Allowance in Japanese Appln No. 2020-566231, dated Oct. 24, 2022, 5 pages (with English translation).

Gummadi et al., "Not-a-Bot: Improving Service Availability in the Face of Botnet Attacks," NSDI, Apr. 2009, 14 pages.

Li et al., "Adattester: Secure online mobile advertisement attestation using trustzone," Proceedings of the 13th annual international conference on mobile systems, applications, and services, May 2015, 14 pages.

PCT International Search Report and Written Opinion in International Appln. No. PCT/US2020/016998, dated Sep. 24, 2020, 15 pages.

PCT International Search Report and Written Opinion in International Appln. No. PCT/US2020/017027, dated Sep. 24, 2020 14 pages.

AU Office Action in Australian Appln. No. 2020260456, dated May 27, 2021, 6 pages.

Hearing Notice in Indian Appln. No. 202027047339, dated May 26, 2023, 2 pages (with English translation).

Notice of Allowance in Canada Appln. No. 3,100,347, dated Oct. 6, 2022, 1 page.

Office Action Korean Appln. No. 10-2020-7032598, dated Nov. 20, 2021, 14 pages (with English translation).

Notice of Allowance in Canada Appln. No. 3,100,322, dated Jan. 18, 2023, 1 page.

International Preliminary Report on Patentability in International Appln. No. PCT/US2020/016998, mailed on Aug. 18, 2022, 8 pages.

International Preliminary Report on Patentability in International Appln. No. PCT/US2020/017027, mailed on Aug. 18, 2022, 9 pages.

Office Action in Chinese Appln. No. 202080003023.1, dated Aug. 31, 2022, 5 pages (with English search report).

Office Action in Indian Appln. No. 202027047338, dated Sep. 13, 2022, 6 pages (with English translation).

Office Action in Indian Appln. No. 202027047339, dated Sep. 12, 2022, 7 pages (with English translation).

Office Action in Korean Appln. No. 10-2020-7034019, dated Aug. 10, 2022, 2 pages (with English translation).

* cited by examiner

VERIFYING USER INTERACTIONS ON A CONTENT PLATFORM

CROSS-REFERENCE TO RELATED APPLICATION

This application is a National Stage Application under 35 U.S.C. § 371 and claims the benefit of International Application No. PCT/US2020/016998, filed Feb. 6, 2020. The disclosure of the foregoing application is hereby incorporated by reference in its entirety.

BACKGROUND

This specification generally relates to detecting errors that can occur in content presentation and verifying whether an interaction with a particular content item displayed on a content platform is an interaction by an actual human user.

A client device can use an application (e.g., a web browser, a native application) to access a content platform (e.g., a search platform, a social media platform, or another platform that hosts content). The content platform can display, within an application launched on the client device, content that may be provided by one or more content providers. In some instances, the application may erroneously record interactions with content provided on the content platform and displayed within the application. This may be due to any number of reasons, such as errors in the application (including the software development kit (SDK) for the application) within which the content platform is displayed and/or errors in the content platform.

SUMMARY

In general, one innovative aspect of the subject matter described in this specification can be embodied in methods including the operations of receiving, from a first application executing on a client device, a request to generate a click verification token that is used to verify whether a first interaction with a particular content item provided for display in the first application is an interaction by a user of the client device, wherein the request includes initial attestation data that is identified by the first application as being obtained from the operating system, the initial attestation data including: data for a first set of parameters that is identified by the first application as being descriptive of the first interaction; and a first message authentication code (MAC) set that is identified by the first application as being generated using the data for the first set of parameters; obtaining, from the operating system, an indication specifying whether the first MAC set is identical to a second MAC set, wherein the second MAC set is generated by the operating system using the data for the first set of parameters that is included in the request; in response to obtaining the indication specifying that the first MAC set is identical to the second MAC set, generating a click verification token that is used to verify whether the first interaction is an interaction by the user of the client device, wherein a payload of the click verification token includes the (1) data for a first set of parameters that is descriptive of the first interaction and (2) data identifying the particular content item data; and providing, to the first application, the generated click verification token. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, methods can include detecting, by the operating system and during execution of the first application on the client device, the first interaction by the user with a display of the client device; obtaining, by the operating system and for the first interaction by the user, the data for the first set of parameters that is descriptive of the first interaction; generating, by the operating system, the first MAC set using the data for the first set of parameters; providing, by the operating system and to the first application, data that includes (1) the data for the first set of parameters that is obtained by the operating system; and (2) the first MAC set generated by the operating system; and wherein data included in the initial attestation data represents the data provided by the operating system to the first application.

In some implementations, generating the first MAC set using the data for the first set of parameters can include generating, using the data for the first set of parameters, a first MAC for a first user action corresponding to a physical user contact with the display of the client device and a second MAC for a second user action corresponding to a release of the physical user contact from the display; the first MAC set included in the request comprises the first MAC and the second MAC; the second MAC set generated by the operating system using the data for the first set of parameters, includes (1) a third MAC generated using the data for the first set of parameters included in the request that is identified as corresponding to the first user action and (2) a fourth MAC generated using the data for the first set of parameters included in the request that is identified as corresponding to the second user action; and obtaining, from the operating system, an indication specifying that the first MAC set is identical to a second MAC only if the operating system determines that the first MAC set is identical to the second MAC set, including determining that (1) the first MAC is identical to the third MAC and (2) the second MAC is identical to the fourth MAC.

In some implementations, the first set of parameters can include one or more of the following parameters: a user action; a location of the display corresponding to the user action; a tool used to perform the user action; a timestamp identifying a time when the user action was performed; and a source from which the user action was received.

In some implementations, each of the first MAC set and the second MAC set can be generated using a hashed message authentication code algorithm and a secret cryptographic key stored by the operating system.

In some implementations, generating the click verification token can include generating the click verification token by a second application that is separate from the first application and the operating system.

In some implementations, the first application can be a user application or a native application; and the second application can be a trusted application that operates within a secured environment on the client device.

In some implementations, methods can include sending, by the first application and to a content verification system, the generated click verification token; receiving, from the content verification system, a message indicating that the first interaction is a user interaction, wherein the message received from the content verification system is generated only if the content verification system confirms, based on the click verification token, that the first interaction is a user interaction.

Particular embodiments of the subject matter described in this specification can be implemented to realize one or more of the following advantages. Techniques described in this specification can identify errors (e.g., software errors, bugs, etc.) in an application (which can include the application's SDK) executing on the client device that presents a content page provided by a content platform and/or errors in the content platform. For example, such errors may incorrectly record interactions with the content displayed in the application as interactions by actual human users. In some instances, such errors may be a software error, but could also be an error injected by a malicious entity, which may have compromised the application, its SDK, the communication channel between content providers and the content platform, or the content platform that is displayed with the application. To identify such errors or malicious actions, the techniques described in this specification can verify whether an interaction with a particular content item (e.g., a third party content item provided by a third party content provider or an organic content item provided by the content platform) provided for display in the first application is an interaction by an actual human user of the client device.

The techniques described in this specification also provide independent verification of whether an interaction with a particular content item (e.g., a third party content item provided by a third party content provider or an organic content item provided by the content platform) provided for display in an application executing on the client device is an interaction by an actual human user of the client device. In other words, the content interaction verification techniques described in this specification do not simply rely upon the representations made by (e.g., data submitted by) the application and/or its SDK (or the content platform executing within the application) regarding the interaction(s) with the content displayed within the application (as was the case in conventional solutions). Rather, the techniques described in this specification rely upon independent processing by the client device—e.g., the processing of the operating system (and/or a web browser), alone or in cooperation with a separate application executing on the client device—to perform such verification. The techniques described herein analyze an interaction with content provided on the content platform and displayed on the client device, and generate a content verification token that can be used to verify whether a particular interaction with a particular content item provided for display in the application is an interaction by an actual human user of the client device.

Relatedly, the techniques described in this specification enable secure transmission, from the client device to the content provider (or another content verification entity), of the information that may be used by the content provider (or another content verification entity) to verify whether a first interaction with a particular content item is an interaction by an actual human user. A malicious application, SDK, or other software component may attempt to tamper with or forge (1) the data about interactions recorded and processed by the operating system (or a web browser) and provided to the application, and/or (2) the data transmitted by the client device to the content provider (or another content verification entity) to verify whether a particular interaction is an actual human user interaction. Such intervention by a malicious entity may cause a particular interaction to be incorrectly verified as an actual human user interaction. To overcome such malicious intervention, the techniques described in this specification utilize certain cryptographic techniques to secure the transmission of information from the operating system to an application and from an application/client device to the content provider. As a result, the content verification process described in this specification is less likely to succumb to malicious or fraudulent actions designed to deceive the content provider (or another appropriate verification system) during the content verification process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to computer implemented methods and systems that detect errors that can occur in content presentation and verify whether an interaction with a particular content item displayed on a content platform is an actual interaction by a human user of the client device, or whether an indication of the interaction has been generated by a computer process or otherwise erroneously identified as an interaction by a human user.

A content provider (or another appropriate content verification system) may want to verify that an interaction (also referred to in this specification as a first interaction) with a particular content item—that it provides to a content platform for display (or that is otherwise provided for display) within an application executing on a client device (also referred to as the first application)—is an interaction by a human user of the client device, and not some falsified indication of a human interaction. The techniques described in this specification—as summarized below and as described in additional detail throughout this specification—enable such interaction verification (also referred to in this specification as click verification) by relying on trusted software processes of a client device, such as secure/privileged code of the operating system, a web browser, and/or a trusted system application (as further described in this specification) in cooperation with a content provider (or another appropriate content verification system).

As further described throughout this specification, a trusted application (which may be part of or separate from the operating system of the client device or a web browser) receives a request from the first application to generate a click verification token. This click verification token can be used, e.g., by a content verification system, to verify that an interaction with a particular content item (e.g., a third party content item provided by the content provider or an organic content item provided/published by the content platform) on a content page within the application is an interaction by an actual human user.

Before generating this click verification token, the trusted application determines whether certain data included with the request, which is identified by the first application as being obtained from the operating system (or the web browser), is indeed generated and/or obtained from the operating system (or the web browser). This data can include data for a first set of parameters that is identified by the first application as being descriptive of the first interaction and a first message authentication code (MAC) set that is identified by the first application as being generated using the data for the first set of parameters. The trusted application provides this data to the operating system (or the web browser), which generates a second MAC set using the data for a first set of parameters that is included with the request.

If the second MAC set is not identical to the first MAC set, the operating system (or the web browser) determines that the first interaction is not an interaction by an actual human user and that there may be an error in the application (and/or its SDK) and/or the content platform.

On the other hand, if the second MAC set is identical to the first MAC set, the operating system (or the web browser) concludes that the first interaction is an interaction by an actual human user. In this case, the operating system (or the web browser) also indicates to the trusted application that the first MAC set is identical to the second MAC set and thus, the data included in the request is authentic (and not forged/compromised).

In response to the determination that the first MAC set is identical to the second MAC set, the trusted application generates the click verification token using the data for the first set of parameters included in the request. In generating this token, the trusted application includes in the payload of the click verification token (1) data for a first set of parameters that is descriptive of the first interaction and/or (2) data identifying the particular content item.

The click verification token is subsequently used by the content provider (or another content verification system) to verify if the first interaction is an interaction by an actual human user, or if the first interaction has been erroneously generated and/or falsified. As part of this click verification, the content provider validates whether the click verification token is authentic. If not, the content provider concludes that the first interaction is not an interaction by an actual human user and that there may be an error in the application (and/or its SDK) and/or the content platform. If the content provider determines that the click verification token is authentic, it uses a rules-engine or another statistical model (e.g., a supervised or unsupervised machine learning model) to determine whether the data for the first set of parameters indicates that the first interaction is an interaction by an actual human user. Based on this processing, the content provider can either conclude that the first interaction is an interaction by an actual human user, or not. When the content provider concludes that the first interaction is not an interaction by an actual human user, the content provider could provide a message to the application and/or the content platform indicating that there may be an error in the application (and/or its SDK) and/or the content platform.

The above-described features and additional features are described in more detail below.

Figure 1:
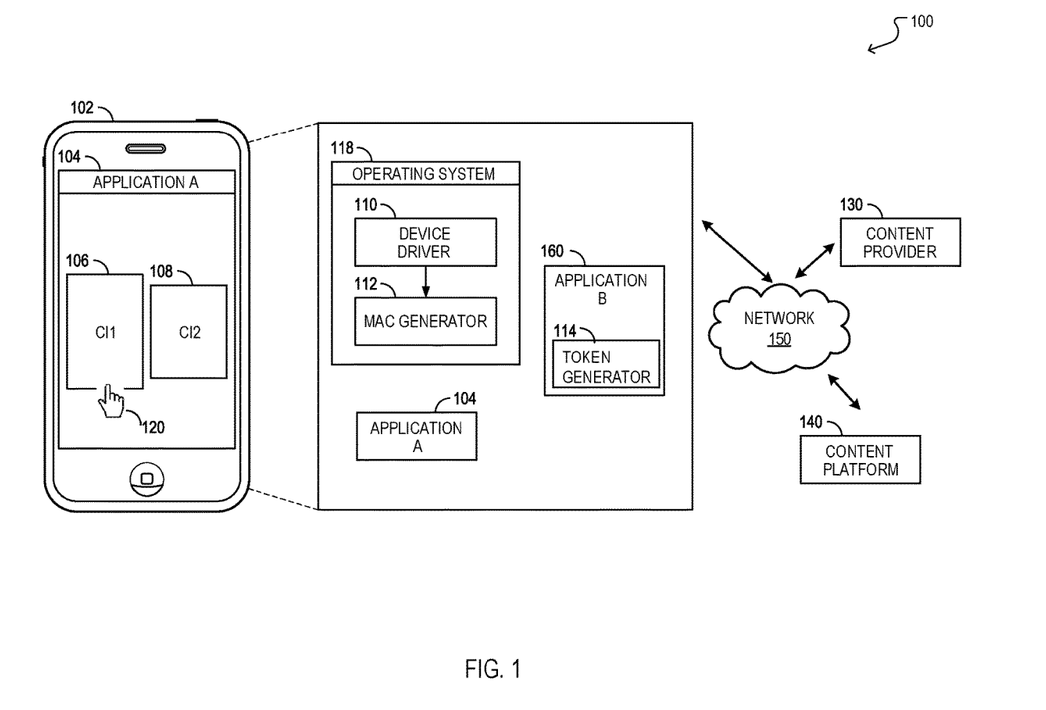
FIG. 1 is a block diagram of an example environment in which content is provided for display within a content platform accessed within an application on a client device.

FIG. 1 an example environment 100 in which content is provided for display within a content platform accessed within an application on a client device. The example environment 100 includes a network 150, such as a local area network (LAN), a wide area network (WAN), the Internet, or a combination thereof. The network 150 connects client devices 102, content platforms 140, and content providers 130. The example environment 100 may include many different content providers 130, content platforms 140, and client devices 102.

A client device 102 is an electronic device that is capable of requesting and receiving content over the network 150. Example client devices 102 include personal computers, mobile communication devices, digital assistant devices, and other devices that can send and receive data over the network 150. A client device 102 typically includes a user application, such as a web browser, to facilitate the sending and receiving of data over the network 150, but native applications executed by the client device 102 can also facilitate the sending and receiving of content over the network 150. Examples of content presented at a client device 102 include webpages, word processing documents, portable document format (PDF) documents, images, videos, and search results pages.

A content platform 140 is a computing platform (such as, e.g., a data processing apparatus as described with reference to FIG. 3) that enables distribution of content. Example content platforms 140 include search engines, social media platforms, new platforms, data aggregator platforms, or other content sharing platforms. Each content platform 140 may be operated by a content platform service provider.

The content platform 140 can publish and make available its own content. For example, the content platform 140 may be a news platform, which publishes its own news articles. The content platform 140 may also present content provided by one or more content providers 130 that are not part of the content platform 140. In the above example, the news platform may also present third party content provided by one or more content providers 130. As another example, the content platform 140 may be a data aggregator platform that does not publish any of its own content, but aggregates and presents third party content provided by different content providers 130.

As used in this specification, a content provider 130 can be a data processing apparatus (as described with reference to FIG. 3) and can include servers, repositories, or other storage devices that store content generated and/or published by one or more entities and that provide content to content platforms 140 and/or client devices 102 in response to requests for content from these entities.

When a client device 102 accesses a content page provided by a content platform 140 within an application, Application A 104 (such as a browser or a native application), a script on the content page requests content from one or more content providers 130 that are not part of the content platform 140. In response to this request for content, a content provider 130 provides third party content that can be presented as content items (e.g., content item CI1 106 or content item CI2 108) within the application.

The client device 102 can work in cooperation with the content provider 130 to verify whether an interaction with a particular content item provided by the content provider 130 is a user interaction. The techniques by which the client device 102 and the content provider 130 cooperatively perform this verification are summarized below and are described in additional detail with reference to FIG. 2.

In some implementations (as described with reference to FIG. 2), the application 104 requests a trusted application to generate a click verification token that is used to validate whether an interaction with the content item CI1 106, which is provided on the content page within the application 104 and displayed at a particular portion of the display of the client device, is a user interaction. As used in this specification, a trusted application is an application that operates within a secured environment on the device and performs certain core device services (similar to device services performed by the privileged/kernel code within the operating system). In some implementations, the trusted application itself can be part of the operating system or a web browser, or is implemented and/or published by the operating system vendor (or the web browser vendor).

This trusted application in cooperation with the operating system (e.g., the privileged or trusted code within the operating system 118, which includes software components such as the device driver 110 and the MAC generator 112) (or the web browser) is used in generating the click verification token and providing this token to the application 104. The application 104 provides this click verification token to the content provider 130, which in turn uses this click verification token in performing the verification that the interaction is an interaction by an actual human user of the client device 102. As used in this specification, the privileged or trusted code within the operating system is operating system code that runs only in kernel mode (i.e., code/instructions that can only be executed by the operating system and not by any other user, application, or entity). As a result, the privileged or trusted code is less likely to be vulnerable to penetration by other applications/entities.

In some implementations (also as described with reference to FIG. 2), the operating system 118 (instead of the trusted application, which may be part of or separate from the operating system 118) generates the click verification token and provides this click verification token to the application 104.

Figure 2:
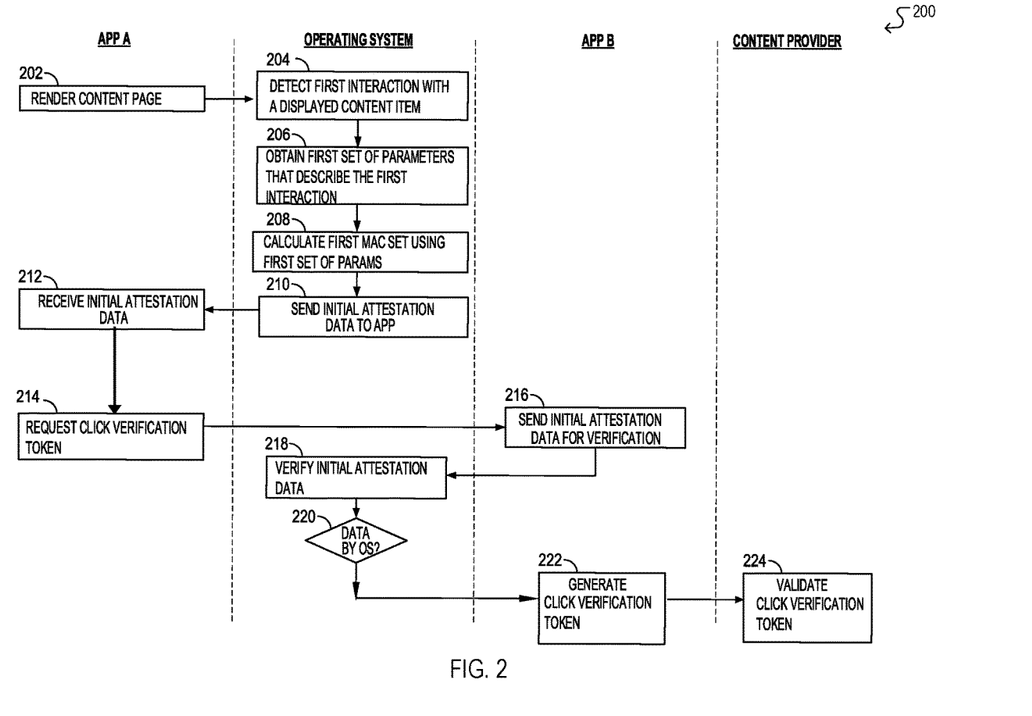
FIG. 2 a swim lane diagram that illustrates an example process for detecting errors and verifying whether an interaction with a particular content item provided for display in an application is an interaction by an actual human user.

The structure and/or operations of each of the above-referenced components of FIG. 1 are described in additional detail with reference to FIG. 2.

FIG. 2 is a swim lane diagram that illustrates an example process 200 for detecting errors and verifying whether an interaction with a particular content item provided for display in a first application is an interaction by an actual human user. Operations of process 200 are described below as being performed by the components of the system described and depicted in FIG. 1; however, such descriptions are for illustration purposes only. Operations of the process 200 can be performed by any appropriate device or system, e.g., any appropriate data processing apparatus as described with reference to FIG. 3. Operations of the process 200 can also be implemented as instructions stored on a non-transitory computer readable medium.

Application A 104 (also referred to in the following description as first application or application 104) renders a content page (at 202). In some implementations, when application 104 renders the content page, it provides for display within the application 104, content items CI1 106 and CI2 108. As described with reference to FIG. 1, one or more of these content items could be a third party content item that is obtained from one or more content providers 130.

During execution of the application 104 on the client device 102, the operating system 118 of the client device 102 detects a first interaction by the user of the client device 102 with a displayed content item, such as CI1 106 (at 204). In some implementations, the first interaction by the user is made up of two user actions events: a first user action corresponding to a physical user contact with the display of the client device and a second user action corresponding to a release of the physical user contact from the display. However, the first interaction could be a single user action (e.g., such as a gesture) or more than two user actions.

In some implementations, the device driver 110 (e.g. on devices with touchscreen, the device display driver; on devices with keyboards, mouse, or trackball, the corresponding device driver for these devices) of the operating system 118 can be actively listening for and recording every user interaction with the display of the client device 102, such as, e.g., a mouse click on portions of the display, a touch (by a finger or another object like a stylus) on a portion of a touch-sensitive display. Alternatively, the device driver 110 can listen for and record user interactions on the display in response to an application granting the device driver 110 permission to record such interactions during execution of that application.

The device driver 110 obtains data for the first set of parameters for the first interaction by the user (at 206). In some implementations, upon detecting the first interaction by the user, the device driver 110 records information about one or more of the parameters that are descriptive of the first interaction by the user. Non-limiting examples of such parameters include: (1) an identification of the user action(s) (e.g., an action corresponding to a physical user contact with the display, another action corresponding to a release of the physical user contact from the display); (2) a location of the client device 102's display corresponding to the user action(s) (e.g., an X-Y coordinate on the display corresponding to the user action); (3) a tool used to perform the action (e.g., mouse, stylus, finger); (4) a source from which the user action was received (e.g., display/touchscreen, mouse, a camera for gesture recognition); and (5) a timestamp identifying a time when the user action was performed (e.g., a time that is precise to the micro or millisecond, the timestamp could also be the date of the user action).

For example, assume that the first interaction includes two user actions: a first user action corresponding to a physical user contact with the device 102's display (e.g., a touch of the screen, a press of a mouse button when the pointer is at a particular point of the display) and a second user action corresponding to a release of the physical user contact from the display (e.g., a release of the touch of the screen, a release of the a mouse button when the pointer is at a particular point of the display). In this example, the device driver 110 records a first set of data for a first set (e.g., one or more) of parameters (such as the parameters described above) that are descriptive of the first user action and a second set of data for the same first set of parameters that are descriptive of the second user action.

The MAC generator 112 generates a first message authentication code (MAC) token set using data for the first set of parameters (at 208). In some implementations, the first MAC set includes a separate MAC corresponding to each user action. Using the above example of two actions making up the first interaction, the MAC generator 112 generates (1) a first MAC using data for the first set of parameters corresponding to the first user action (e.g., a physical user contact with the display of the client device) and (2) a second MAC using data for the first set of parameters corresponding to the second user action (e.g., a second user action corresponding to a release of the physical user contact from the display). Alternatively, the first MAC set can include a single MAC corresponding to all the actions making up the first interaction by the user.

In some implementations, the MAC generator 112 generates each MAC in the first MAC set using a hash-based message authentication code (HMAC) algorithm (e.g., a HMAC-SHA256 algorithm). In some implementations, the MAC generator 112 generates an HMAC of the data for the first set of parameters obtained by the device driver 110 using a secret cryptographic key of the operating system 118 (which is stored in a secure location within the client device 102). Alternatively, the MAC generator 112 can use another secure cryptographic key when generating the HMAC.

For example, if two user actions make up the first interaction, the MAC generator 112 generates (1) a first HMAC (i.e., a first MAC) using data for the first set of parameters corresponding to the first user action and (2) a second HMAC (i.e., a second MAC) using data for the first set of parameters corresponding to the second user action. Alternatively, instead of generating a separate token for each user action, the MAC generator 112 generates a single HMAC (i.e., MAC) using data for the first set of parameters corresponding to each of the user actions making up the first interaction by the user.

Alternatively, instead of generating an HMAC, the MAC generator 112 can use other symmetric or asymmetric encryption or authentication algorithms to generate one or more tokens that encrypts or otherwise secures the data for the first set of parameters for the user action(s) making up the first user interaction.

For convenience and simplicity, the following descriptions assume that the first interaction is made up of two user actions and that the MAC generator 112 generates a separate HMAC (or a separate token generated using another encryption or authentication technique) for the data for the first set of parameters for each user action. However, as described above, the first interaction could be made up of one or more user actions, and the MAC generator 112 can generate a separate HMAC (or a token generated using another encryption or authentication technique) using data for the first set of parameters for each of the user action(s) or a single HMAC (or a token generated using another encryption or authentication technique) for the data for the first set of parameters for all the user action(s).

The operating system 118 sends initial attestation data to the application 104 (at 210). In some implementations, the operating system 118 packages the one or more data items obtained and/or processed in operations 204-208 into initial attestation data. The initial attestation data can thus include (1) the data for the first set of parameters that is obtained by the device driver 110 and/or (2) the first MAC set generated by the MAC generator 112. Each data item in the initial attestation data can either be stored in a separate data structure or can be stored together with other data items of the initial attestation data in a single data structure. In either case, the collection of the separate data structures or the single data structure is still referred to as initial attestation data.

The application 104 receives the initial attestation data sent by the operating system 118 (at 212). In some implementations, the application 104 associates the initial attestation data with the first interaction with the particular content item, which in this case is CI1 106. For example, the application 104 can store a data structure that includes (1) data identifying the particular content item and (2) initial attestation data for the first interaction by the user with the particular content item.

The application A 104 sends to the application B 160 (also referred to as the second application or application 160), and the application B 160 receives from the application A 104, a request to generate a click verification token (at 214). As used in this specification, the click verification token is a digitally signed token that is used to validate whether an interaction (e.g., whether it is based on a mouse click, finger or stylus touch with a display of the client device 102) with a particular content item provided for display in an application is an interaction by an actual human user of the client device. Details regarding the generation of the click verification token are described with reference to operation 224. In some implementations, application B 160 is a trusted application (as described in this specification), which is separate from the application A 104 and the operating system 118. In other implementations, application B 160 can be part of the Operating System 118, or is implemented and/or published by the Operating System vendor.

In some implementations, the application 104, which can be a native application, can include a software development kit (SDK) or an application programming interface (API) that causes the application 104 to generate the request. In implementations where the application 104 is a web browser, a script executing on the page can generate the request.

In some implementations, the request to generate a click verification token includes initial attestation data that is identified by the application 104 as being obtained from the operating system 118. The request can also include the data identifying the particular content item, CI1 106.

This initial attestation data that the application 104 provides with the request can include (1) data for a first set of parameters that is identified by the application 104 as being descriptive of the first interaction and (2) a first MAC set that is identified by the application 104 as being generated using the data for the first set of parameters. The data for the first set of parameters included in the request can include data for the first set of parameters that is identified as corresponding to the first user action and data for the first set of parameters that is identified as corresponding to a second user action. In some implementations, the initial attestation data can be provided as an array (or another appropriate data structure).

The initial attestation data included by the application 104 in the request can be the initial attestation data corresponding to the first user interaction that the operating system 118 sends to the application 104 at operation 210. In some implementations, the two sets of data are identical. In alternative implementations, the two sets of data can be substantively identical, but the transformed data is nevertheless representative of the original data. For example, some transformation might be applied, e.g., the X-Y coordinate in the initial attestation data included in the request could be in the absolute coordinate of the screen, while the X-Y coordinate collected by the operating system 118 could be in some other coordinate system more meaningful to the application.

However, the application 104 can also provide a different set of initial attestation data that is different from the initial attestation data generated (at operation 210) for the first interaction by the user. This may be due to an error in the application 104 and/or the content platform 140. In some instances, this may also indicate that a malicious entity/application is attempting to compromise the click verification.

In some implementations, upon receiving the request from the application 104, the application B 160 generates a click verification token after it has confirmed that the initial attestation data included in the request received from the application 104 was in fact generated/obtained by the operating system 118. This verification ensures that there are no errors in the application 104 or the content platform 140, and also identifies any malicious entity/application's attempt to include forged or invalid data that is designed to inappropriately obtain a click verification. In some implementations, the verification request by the application B 160 requests that the operating system 118 validate that the initial attestation data received in the request is generated by the operating system 118. Along with the request to verify the initial attestation data, the application B 160 sends to the operating system 118 the initial attestation data included in the request received from the application 104 (at operation 214).

In response to operation 214, the operating system 118 verifies whether the initial attestation data included in the request received from the application 104 (at operation 214) is generated and/or obtained by the operating system 118 (at 218, 220). In some implementations, the operating system 118 performs this verification in two steps, as described in the following paragraphs.

First, the operating system 118 generates a second MAC set using the data for the first set of parameters included in the initial attestation data provided at operation 214. In some implementations, the MAC generator 112 generates a set of HMACs (or another secure token generated using an appropriate encryption or authentication algorithm) using the data for the first set of parameters included in the initial attestation data provided at operation 214 (in the same manner as described with reference to operation 208). Thus, the MAC generator 112 can generate (1) a third HMAC or another secure token generated using an appropriate encryption or authentication algorithm (i.e., a third MAC) using the data for the first set of parameters included in the request that is identified by the application 104 as corresponding to a first user action and (2) a fourth HMAC or another secure token generated using an appropriate encryption or authentication algorithm (i.e., a fourth MAC) for the first set of parameters included in the request that is identified by the application 104 as corresponding to a second user action. The MAC generator 112 generates the HMACs (or other appropriate secure tokens) using the same algorithm(s) and cryptographic keys used in generating the first MAC set (generated at operation 208).

Second, the operating system 118 determines whether the first MAC set is identical to the second MAC set. This comparison is illustrated using the above described example in which each of the first MAC set and the second MAC set include two MACs, each corresponding to a separate user action. Thus, in the above example, the first MAC set, which is included in the initial attestation data provided by the application 104, includes (1) a first MAC that is identified by the application 104 as corresponding to the first user action and (2) a second MAC that is identified by the application 104 as corresponding to the second user action. Continuing with this example, the second MAC set includes (1) a third MAC generated using the data for the first set of parameters included in the request that is identified as corresponding to the first user action and (2) a fourth MAC generated using the data for the first set of parameters included in the request that is identified as corresponding to the second user action. The operating system 118 determines whether the first MAC set is identical to the second MAC set by determining whether (1) the first MAC is identical to the third MAC and (2) the second MAC is identical to the fourth MAC.

If the operating system determines that the first MAC set is identical to the second MAC set (e.g., first MAC is identical to the third MAC and the second MAC is identical to the fourth MAC), the operating system 118 concludes that the initial attestation data is valid (i.e., the initial attestation data was generated by the operating system 118) and provides an indication to the application B 160 specifying that the first MAC set is identical to a second MAC set. On the other hand, if the operating system determines that the first MAC set is not identical to the second MAC set (e.g., first MAC is not identical to the third MAC and/or the second MAC is not identical to the fourth MAC), the operating system 118 concludes that the initial attestation data is invalid (i.e., the initial attestation data was not generated by the operating system 118) and provides an indication to the application B 160 specifying that the first MAC set is not identical to a second MAC set.

In some implementations, instead of generating a MAC set (at operation 208, 218, and 220), the operating system 118 can store all the data included as part of the initial attestation data (or a cryptohash of them that is generated using a cryptographic hash function). The operating system 118 sends this data (or a cryptohash of it) to the application 104. Then, when application B 160 requests verification of the initial attestation data (at operation 216), the operating system 118 can verify that the received initial attestation data was indeed generated by the operating system by comparing this received data (or a cryptohash of it) with the saved initial attestation data (or the cryptohash of it).

In response to receiving an indication from the operating system 118 specifying whether the first MAC set is identical to the second MAC set, a token generator 114 of the application B 160 generates a click verification token (at 224). In some implementations, the click verification token generated by the token generator 114 is an attestation token that can include a set of data, which includes at least a user identifier and a payload, and in some instances, a device integrity token as well (in other words, the device integrity token can be, but need not be, included in the payload). The attestation token also includes a digital signature of this set of data. The following paragraphs describe each data item in the set of data and the digital signature of this set of data.

The user identifier that can be included in the attestation token includes a public key of the client device 102. For example, the client device 102 can generate and/or maintain one or more pairs of cryptographic keys including a device private key and a device public key. The device public key corresponds to, and is mathematically linked to, the device private key. Data that is digitally signed using a private key can only be verified using the corresponding public key. Similarly, data that is encrypted using the public key can only be decrypted using the corresponding private key.

The payload that can be included in the attestation token includes the following data included in the request of operation 214: (1) data for a first set of parameters that is descriptive of the first interaction and (2) data identifying the particular content item. Each of the data items—including the data identifying the particular content item and the data for the one or more of the attributes—can be included in the payload as an array (or another data structure), with each position of the array including data for a separate attribute. In instances in which the operating system 118 determines that the first MAC set is not identical to the second MAC set, the application B 160 can simply include a message in the payload, which includes the indication by the operating system 118 specifying that the first MAC set is not identical to the second MAC set. In some instances, the payload of the attestation can be encrypted, e.g., using public-private encryption key techniques. For example, the payload could be signed with the public key of a content verification system, which can only be decrypted using the private key of the content verification system.

The integrity token that can be included in the attestation token includes a device integrity token that enables an entity to determine whether a request 120 was sent by a trusted client device 110. The device integrity token can be issued by a third-party device integrity system that evaluates fraud signals of client devices and assigns a level of trustworthiness to the client devices based on the evaluation. The device integrity token for a client device 102 can include (1) a verdict that indicates the level of trustworthiness (or integrity) of the client device 102 at the time that the device integrity token was generated, (2) a device integrity token creation time that indicates a time at which the device integrity token was generated, and (3) a unique identifier for the client device 102 (which can be, e.g., the device public key of the client device or its derivative). The device integrity token can also include a digital signature of the data in the device integrity token. This digital signature can be generated using a private key of the device integrity system.

For example, the device integrity system can sign the data using its private key, which the system maintains confidentially. The entities that receive the device integrity token can use a public key of the device integrity system to verify the signature of the device integrity token. Including the device public key for the client device 102 in both the device integrity token and the attestation token binds these two tokens together. In other words, by including the device public key of the client device 102 in the device integrity token, a recipient of the attestation token can determine that the device integrity token was generated for that client device 102. This prevents other parties from being able to include a device integrity token for a trusted device in requests from an emulator or a compromised client device.

The digital signature that can be included with the attestation token can be a digital signature of the above-described set of data (or some variant thereof). This digital signature is generated using the device private key, which can be maintained securely and confidentially by the operating system 118 of the client device 102. For example, the digital signature can be a digital signature of the payload (either encrypted or unencrypted), the user identifier (e.g., device public key), and the integrity token. In some implementations, the operating system 118 generates the digital signature using an Elliptic Curve Digital Signature Algorithm (ECDSA), but other signature techniques can also be used, such as RSA.

In some implementations, instead of an attestation token, another type of secure token can be generated by the token generator 114, which also can be used to secure the communication of all/subset of the initial attestation. For example, this data can be digitally signed using a private key of a third party integrity system. The entities that subsequently receive the click verification token, such as the content provider 130, can request the corresponding public key from the third party integrity system, and then use this key to verify the signature and the attribute data.

Returning to the process 200, the application B 160 provides the generated click verification token to the application A 104.

The application A 104 sends a click verification token to the content provider 130 (or another appropriate content verification system). This click verification token may be the token generated by the operating system 118 at operation 222 or it may be another data item that the application 104 identifies as a click verification token.

Upon receiving the click verification token, the content provider 130 (or another appropriate content verification system) validates the click verification token (at 224). In some implementations, as part of this validation, the content provider 130 decrypts the payload of the click verification token to obtain data for the first set of parameters (assuming a scenario in which the payload is encrypted).

In implementations in which the attestation token is used as the click verification token, the content provider 130 uses the device public key included in the attestation token to validate the digital signature included in the token. In such implementations, the content provider 130 uses the device's public key to generate a digital signature using the data items included in the decrypted payload, device public key, and the device integrity token, and compares this generated digital signature with the digital signature included in the attestation token. If the comparison does not reveal identical digital signatures, the content provider 130 concludes that the first interaction is not an interaction by the user of the client device 102. In such instances, the content provider 130 can send a message to the application 104 indicating that there may be an error in the application 104 (and/or its SDK) and/or the content platform 140. On the other hand, if the comparison reveals identical digital signatures, the content provider 130 obtains the data for the first set of parameters that is descriptive of the first interaction, which is included in the payload of the attestation token, and continues with the click verification.

In some implementations, if the attestation token includes the signed device integrity token, the content provider 130 can interact with the appropriate device integrity system to obtain a public key for the system (as described above). The content provider 130 uses this public key to verify that the device integrity token was indeed created by the device integrity system and was not modified after creation, by verifying the digital signature in the device integrity token. If the digital signature in the device integrity token is successfully verified using the obtained public key, and if the device integrity data present in the verified device integrity token indicates that the device is trustworthy, the content provider 130 continues its content validation. However, if the device integrity token cannot be verified using the obtained public key, and/or if the device integrity data obtained upon verifying the token indicates that the device is untrustworthy, the content provider 130 can stop any further content validation. In such instances, the content provider 130 can also send a message to the application 104 indicating that there may be an error in the client device 102 that sent the digitally signed token to be used for content validation.

As part of the click verification, the content provider 130 verifies whether the first interaction is an interaction by a user based on the data for the first of parameters that describes the first interaction and is included in the attestation token. In some implementations, the content provider 130 can include a rules-engine that stores a set of rules to evaluate whether the data for the first set of parameters indicates that the first interaction is an interaction by the user. Non-limiting examples of such rules are provided in the following paragraphs.

One example of a click verification rule include whether the location of the device's display (e.g., X-Y coordinates of the device's display, specific content slot within the content page shown on the application 104) corresponding to the user action corresponds to/matches the location of the third party content item, CI1 106, as displayed within the application 104 (e.g., a coordinate range specifying a portion of the device's display, a portion of the application 104 that is allotted by the content platform 140 to the particular content item, CI1 106). If so, the first interaction was likely by an actual human user; otherwise, the first interaction was not likely by an actual human user with the content item 106. Another example is that the X-Y coordinates of the two events (e.g. finger down and finger up) vary significantly from each other, which may indicate that the user interaction with the content item is more likely a drag instead of a click. Another example is that there may be significant time elapsed between the timestamp of the two events (e.g. finger down and finger up), e.g. greater than 1 minute, which may indicate that the recorded interaction might be from some objects (e.g. a pencil) resting on the touchscreen, instead of the user clicking on the content item. Another example is that the two events (e.g. finger down and finger up) are out of chronological order, e.g., the timestamp for finger up event is older than the timestamp for finger down event. If so, the first interaction was likely not by an actual human user; otherwise, the first interaction was likely by an actual human user with the content item 106.

Another example of a click verification rule includes determining whether the tool used to perform the user action is consistent with (e.g., matches) the source from which the user action was received. Thus, e.g., if a mouse is used to perform the user action but the source of the user action is a touchscreen, that indicates an inconsistency (since the expected tool would be either a stylus or a finger). Such inconsistency in turn indicates that the first interaction was not likely by an actual human user.

Another example of a click verification rule includes determining whether the user action is stale. The user action can be considered stale based on whether the difference between the timestamp and the time when the request to verify the click verification token is received (at operation 224) satisfies (e.g., meets or exceeds) a staleness threshold (which may be a pre-determined threshold specifying a duration beyond which a received timestamp may be deemed stale). Thus, if the staleness threshold is two minutes, a received timestamp of 2:14:15 would be considered stale if the time when the request to verify the click verification token is received is two minutes or later (e.g., 2:17:10) than the time of the timestamp. A stale user action can indicate that the first interaction was not likely generated by an actual human user. Conversely, a non-stale user action can indicate that the first interaction was likely by an actual human user.

One or more of the above rules (and other appropriate rules based on the data for the first set of parameters for the first interaction and/or the data identifying the content item) can be combined to obtain a score specifying the likelihood that the first interaction was an interaction by an actual human user. In some implementations, each of the rules may be assigned a weight and the rules-engine assigns a score to each rule. The rules engine generates an aggregate score by combining (e.g., adding) the weighted score for each rule (e.g., by multiplying the weight for each rule by the corresponding score generated for that rule). If this aggregate score satisfies (e.g., meets or exceeds) a particular threshold (e.g., a pre-determined threshold), the rules engine determines that the first interaction is an interaction by an actual human user; otherwise, the rules engine determines that the first interaction is not an interaction by an actual human user.

In some implementations, instead of a rules-engine, a statistical model such as, e.g., a (supervised or unsupervised) machine learning model can be used to determine whether the data for a first set of parameters for the first interaction indicates that the first interaction is an interaction by an actual user. For example, a supervised machine learning model can be trained to do this upon being trained using training data for multiple user interactions, which includes data for a set of parameters for each interaction, and a corresponding set of labels indicating whether the parameter data for a particular interaction in the training data is an interaction by an actual user or not.

If the content provider 130 (or another content verification system) determines that the first interaction is an interaction by an actual human user, the content provider 130 (or another content verification system) generates a message indicating that the first interaction is an interaction by an actual human user. On the other hand, if the content provider 130 (or another content verification system) determines that the first interaction is not an interaction by an actual human user, the content provider 130 (or another content verification system) generates a message indicating that the first interaction is not an interaction by an actual human user. In this instance, the content provider 130 can also indicate that there may be an error in the application (and/or its SDK) and/or the content platform.

In the above-described process flow and system implementation, the application B 160 generates the click verification token. In an alternative implementation, the operating system 118 (instead of the application B 160) can generate the click verification token. In such implementations, while the operating system 118 performs operations 204 and 206, it does not need to perform operations 208 and 210 to securely transmit data (using HMACs or other encryption algorithms) for the first set of parameters obtained for the first user interaction to the application A 104. Similarly, the operations of verifying whether the initial attestation data is generated by the operating system 118 (i.e., operations 216-220) also need not be performed. Instead, the operating system 118 can directly generate the click verification token (in the same manner as described with reference to operation 222) and include the obtained/generated data for the first set of parameters for the first interaction in the payload of the click verification token. In such implementations, the token generator 114 is included within the operating system 118 and is used by the operating system 118 in generating the click verification token. The other operations described with reference to FIG. 2 can still be performed in this implementation by the same entities.

In another alternative implementation, the application B 160 is part of the operating system 118. In such an implementation, and similar to the implementation described in the preceding paragraph, while the operating system 118 performs operations 204 and 206, it does not need to perform operations 208 and 210 to securely transmit data (using HMACs or other encryption algorithms) for the first set of parameters obtained for the first user interaction to the application A 104. Similarly, the operations of verifying whether the initial attestation data is generated by the operating system 118 (i.e., operations 216-220) also need not be performed. Instead, the application B 160 (which is part of the operating system 118 in this implementation) can directly generate the click verification token (in the same manner as described with reference to operation 222) and include the obtained/generated data for the first set of parameters for the first interaction in the payload of the click verification token. The other operations described with reference to FIG. 2 can still be performed in this implementation by the same entities.

In another alternative implementation, the operating system 118 (whether it be an application B 160 that may be included in the operating system 118 or another component(s) of the operating system 118) can generate the click verification token. In this implementation, the operations 204-212 are performed as described above with reference to FIG. 2. Moreover, for operation 214, the application A 104 requests the click verification token from the operating system 118, which in turn performs the initial attestation data validation (as described with reference to operations 218 and 220). In other words, the operation 216, which causes the application B 160 to send the initial attestation data to the operating system 118, can be, but need not be, performed in this implementation. Moreover, in this implementation, the operating system 118 generates the click verification token (in the same manner as described with reference to operation 222) and includes the data for the first set of parameters for the first interaction in the payload of the click verification token. In other words, the token generator 114 is included within the operating system 118 in this implementation and is used by the operating system 118 in generating the click verification token. The other operations described with reference to FIG. 2 can still be performed in this implementation by the same entities.

In some implementations, a web browser, instead of an operating system, performs the operations that are performed by the operating system 118 in the process described with reference to FIG. 2. A brief summary of the operations of process 200 are described as follows, in which the operations of the operating system 118 are now performed by the web browser.

The process begins when a web browser is used to render a content page. In this case, upon/while rendering the content page, a script (e.g., a Javascript) executes and requests the browser's native code to collect initial attestation data. Alternatively, the web browser's native code automatically starts processing user interactions upon detecting such interactions with the device display (e.g., touch on a touchscreen, mouse click of certain portion of the display)—without any prompt by the application 104. The browser's native code has privilege that a script running on a webpage rendered by the browser does not have, and is generally very difficult for any script to penetrate the browser's native code.

The browser's native code then performs (alone or in coordination with the operating system 118) the operations of detecting the first interaction and obtaining a first set of parameters that describe the first interaction.

The browser's native code interacts with the device driver 110 of the operating system 118 to detect the first interaction and obtain a first set of parameters that describe the first interaction (as in operations 204 and 206). The browser's native code, which can include the MAC generator 112, can generate the first MAC set (as described with reference to operation 208). The browser stores in a secure location the cryptographic key that is used by the MAC generator 112 to generate the first MAC set. The browser's native code sends, and the application 104 receives, the initial attestation data, which includes the first MAC set, to the application 104 (as in operations 210 and 212).

A script executing in the browser requests the Application B 160 to generate a click verification token and this request can include the initial attestation data (as described with reference to operation 214). Application B 160 can be a trusted application that is separate from the web browser, or alternatively, the application B 160 can be part of the web browser. In either case, the application B 160 requests that the web browser verify whether it generated the initial attestation data (in substantively the same way as the operating system 118 performed the similar operation at operations 218 and 220). Based on this verification, the application B 160, which can be part of the web browser or separate from it, can generate the click verification token (in substantively the same way as described with reference to operation 222). The application B then returns the generated click verification token to the application A 104. In some implementations, instead of returning the generated click verification token to the application A 104, the application B 160 can directly insert the generated click verification token into an HTTP header. This prevents the calling script from seeing the generated click verification token, which in turn prevents any further security issues (e.g., further attempts by the script or any other entity to compromise the token) and has privacy benefits (e.g., prevents data included in the click verification token from being readily accessible). The application A 104 provides the generated click verification token to the content provider 130 (or another content verification system), which then validates the click verification token (as described with reference to operation 224).

Figure 3:
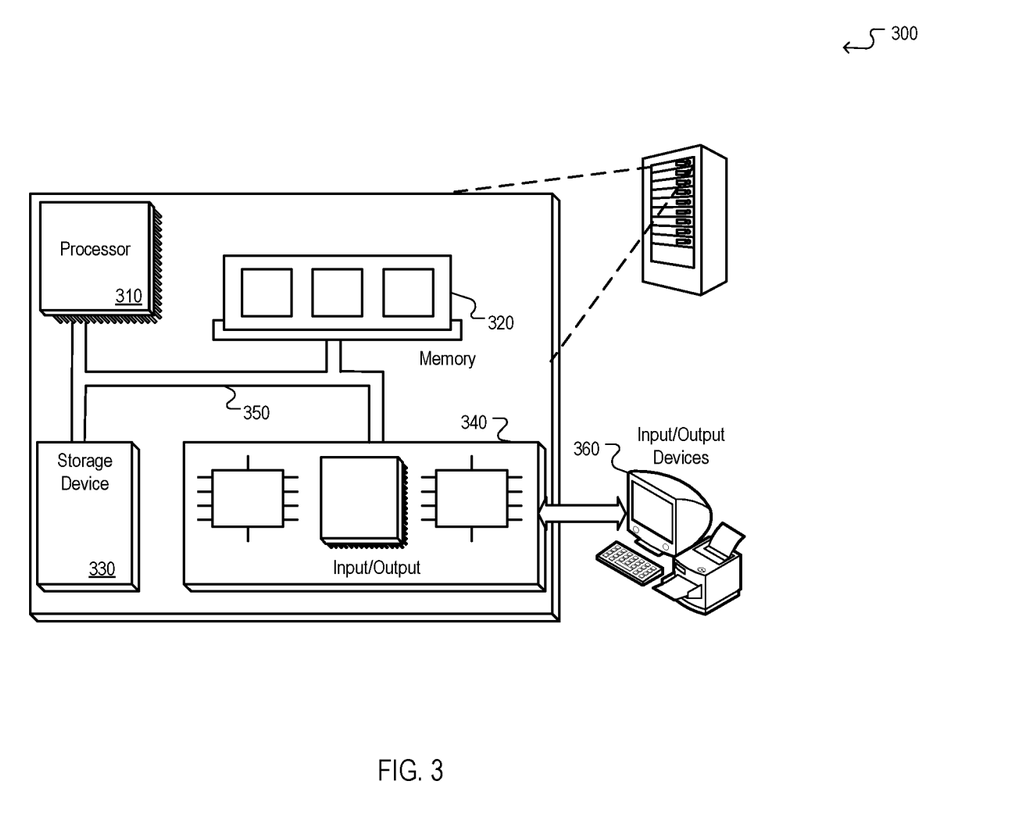
FIG. 3 is block diagram of an example computer system.

FIG. 3 is block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    receiving, from a first application executing on a client device, a request to generate a click verification token that is used to verify whether a first interaction with a particular content item provided for display in the first application is an interaction by a user of the client device, wherein the request includes initial attestation data that is identified by the first application as being obtained from the operating system, the initial attestation data including:
        data for a first set of parameters that is identified by the first application as being descriptive of the first interaction; and
        a first message authentication code (MAC) set that is identified by the first application as being generated using the data for the first set of parameters;
    obtaining, from the operating system, an indication specifying whether the first MAC set is identical to a second MAC set, wherein the second MAC set is generated by the operating system using the data for the first set of parameters that is included in the request;
    in response to obtaining the indication specifying that the first MAC set is identical to the second MAC set, generating a click verification token that is used to verify whether the first interaction is an interaction by the user of the client device, wherein a payload of the click verification token includes the (1) data for a first set of parameters that is descriptive of the first interaction and (2) data identifying the particular content item data; and
    providing, to the first application, the generated click verification token.

2. The computer-implemented method of claim 1, further comprising:
    detecting, by the operating system and during execution of the first application on the client device, the first interaction by the user with a display of the client device;
    obtaining, by the operating system and for the first interaction by the user, the data for the first set of parameters that is descriptive of the first interaction;
    generating, by the operating system, the first MAC set using the data for the first set of parameters;
    providing, by the operating system and to the first application, data that includes (1) the data for the first set of parameters that is obtained by the operating system; and (2) the first MAC set generated by the operating system; and
    wherein data included in the initial attestation data represents the data provided by the operating system to the first application.

3. The computer-implemented method of claim 2, wherein:
    generating the first MAC set using the data for the first set of parameters comprises generating, using the data for the first set of parameters, a first MAC for a first user action corresponding to a physical user contact with the display of the client device and a second MAC for a second user action corresponding to a release of the physical user contact from the display;
    the first MAC set included in the request comprises the first MAC and the second MAC;
    the second MAC set generated by the operating system using the data for the first set of parameters, includes (1) a third MAC generated using the data for the first set of parameters included in the request that is identified as corresponding to the first user action and (2) a fourth MAC generated using the data for the first set of parameters included in the request that is identified as corresponding to the second user action; and
    obtaining, from the operating system, an indication specifying that the first MAC set is identical to a second MAC only if the operating system determines that the first MAC set is identical to the second MAC set, including determining that (1) the first MAC is identical to the third MAC and (2) the second MAC is identical to the fourth MAC.

4. The computer-implemented method of claim 2, wherein the first set of parameters include one or more of the following parameters:
   a user action;
   a location of the display corresponding to the user action;
   a tool used to perform the user action;
   a timestamp identifying a time when the user action was performed; and
   a source from which the user action was received.

5. The computer-implemented method of claim 2, wherein each of the first MAC set and the second MAC set is generated using a hashed message authentication code algorithm and a secret cryptographic key stored by the operating system.

6. The computer-implemented method of claim 2, wherein: generating the click verification token includes generating the click verification token by a second application that is separate from the first application and the operating system.

7. The computer-implemented method of claim 6, wherein:
   the first application is a user application or a native application; and
   the second application is a trusted application that operates within a secured environment on the client device.

8. The computer-implemented method of claim 1, further comprising:
   sending, by the first application and to a content verification system, the generated click verification token;
   receiving, from the content verification system, a message indicating that the first interaction is a user interaction, wherein the message received from the content verification system is generated only if the content verification system confirms, based on the click verification token, that the first interaction is a user interaction.

9. A system, comprising:
   one or more memory devices storing instructions; and
   one or more data processing apparatus that are configured to interact with the one or more memory devices, and upon execution of the instructions, perform operations including:
      receiving, from a first application executing on a client device, a request to generate a click verification token that is used to verify whether a first interaction with a particular content item provided for display in the first application is an interaction by a user of the client device, wherein the request includes initial attestation data that is identified by the first application as being obtained from the operating system, the initial attestation data including:
         data for a first set of parameters that is identified by the first application as being descriptive of the first interaction; and
         a first message authentication code (MAC) set that is identified by the first application as being generated using the data for the first set of parameters;
      obtaining, from the operating system, an indication specifying whether the first MAC set is identical to a second MAC set, wherein the second MAC set is generated by the operating system using the data for the first set of parameters that is included in the request;
      in response to obtaining the indication specifying that the first MAC set is identical to the second MAC set, generating a click verification token that is used to verify whether the first interaction is an interaction by the user of the client device, wherein a payload of the click verification token includes the (1) data for a first set of parameters that is descriptive of the first interaction and (2) data identifying the particular content item data; and
      providing, to the first application, the generated click verification token.

10. The system of claim 9, wherein the one or more data processing apparatus are configured to perform operations further comprising:
   detecting, by the operating system and during execution of the first application on the client device, the first interaction by the user with a display of the client device;
   obtaining, by the operating system and for the first interaction by the user, the data for the first set of parameters that is descriptive of the first interaction;
   generating, by the operating system, the first MAC set using the data for the first set of parameters;
   providing, by the operating system and to the first application, data that includes (1) the data for the first set of parameters that is obtained by the operating system; and (2) the first MAC set generated by the operating system; and
   wherein data included in the initial attestation data represents the data provided by the operating system to the first application.

11. The system of claim 10, wherein:
   generating the first MAC set using the data for the first set of parameters comprises generating, using the data for the first set of parameters, a first MAC for a first user action corresponding to a physical user contact with the display of the client device and a second MAC for a second user action corresponding to a release of the physical user contact from the display;
   the first MAC set included in the request comprises the first MAC and the second MAC;
   the second MAC set generated by the operating system using the data for the first set of parameters, includes (1) a third MAC generated using the data for the first set of parameters included in the request that is identified as corresponding to the first user action and (2) a fourth MAC generated using the data for the first set of parameters included in the request that is identified as corresponding to the second user action; and
   obtaining, from the operating system, an indication specifying that the first MAC set is identical to a second MAC only if the operating system determines that the first MAC set is identical to the second MAC set, including determining that (1) the first MAC is identical to the third MAC and (2) the second MAC is identical to the fourth MAC.

12. The system of claim 9, wherein the first set of parameters include one or more of the following parameters:
   a user action;
   a location of the display corresponding to the user action;
   a tool used to perform the user action;
   a timestamp identifying a time when the user action was performed; and
   a source from which the user action was received.

13. The system of claim 9, wherein each of the first MAC set and the second MAC set is generated using a hashed message authentication code algorithm and a secret cryptographic key stored by the operating system.

14. The system of claim 9, wherein:
generating the click verification token includes generating the click verification token by a second application that is separate from the first application and the operating system.

15. The system of claim 9, wherein the one or more data processing apparatus are configured to perform operations further comprising:
sending, by the first application and to a content verification system, the generated click verification token;
receiving, from the content verification system, a message indicating that the first interaction is a user interaction, wherein the message received from the content verification system is generated only if the content verification system confirms, based on the click verification token, that the first interaction is a user interaction.

16. A non-transitory computer readable medium storing instructions that, when executed by one or more data processing apparatus, cause the one or more data processing apparatus to perform operations comprising:
receiving, from a first application executing on a client device, a request to generate a click verification token that is used to verify whether a first interaction with a particular content item provided for display in the first application is an interaction by a user of the client device, wherein the request includes initial attestation data that is identified by the first application as being obtained from the operating system, the initial attestation data including:
data for a first set of parameters that is identified by the first application as being descriptive of the first interaction; and
a first message authentication code (MAC) set that is identified by the first application as being generated using the data for the first set of parameters;
obtaining, from the operating system, an indication specifying whether the first MAC set is identical to a second MAC set, wherein the second MAC set is generated by the operating system using the data for the first set of parameters that is included in the request;
in response to obtaining the indication specifying that the first MAC set is identical to the second MAC set, generating a click verification token that is used to verify whether the first interaction is an interaction by the user of the client device, wherein a payload of the click verification token includes the (1) data for a first set of parameters that is descriptive of the first interaction and (2) data identifying the particular content item data; and
providing, to the first application, the generated click verification token.

17. The non-transitory computer readable medium of claim 16, wherein the instructions cause the one or more data processing apparatus to perform operations further comprising:
detecting, by the operating system and during execution of the first application on the client device, the first interaction by the user with a display of the client device;
obtaining, by the operating system and for the first interaction by the user, the data for the first set of parameters that is descriptive of the first interaction;
generating, by the operating system, the first MAC set using the data for the first set of parameters;
providing, by the operating system and to the first application, data that includes (1) the data for the first set of parameters that is obtained by the operating system; and (2) the first MAC set generated by the operating system; and
wherein data included in the initial attestation data represents the data provided by the operating system to the first application.

18. The non-transitory computer readable medium of claim 17, wherein:
generating the first MAC set using the data for the first set of parameters comprises generating, using the data for the first set of parameters, a first MAC for a first user action corresponding to a physical user contact with the display of the client device and a second MAC for a second user action corresponding to a release of the physical user contact from the display;
the first MAC set included in the request comprises the first MAC and the second MAC;
the second MAC set generated by the operating system using the data for the first set of parameters, includes (1) a third MAC generated using the data for the first set of parameters included in the request that is identified as corresponding to the first user action and (2) a fourth MAC generated using the data for the first set of parameters included in the request that is identified as corresponding to the second user action; and
obtaining, from the operating system, an indication specifying that the first MAC set is identical to a second MAC only if the operating system determines that the first MAC set is identical to the second MAC set, including determining that (1) the first MAC is identical to the third MAC and (2) the second MAC is identical to the fourth MAC.

19. The non-transitory computer readable medium of claim 16, wherein each of the first MAC set and the second MAC set is generated using a hashed message authentication code algorithm and a secret cryptographic key stored by the operating system.

20. The non-transitory computer readable medium of claim 17, wherein the instructions cause the one or more data processing apparatus to perform operations comprising:
sending, by the first application and to a content verification system, the generated click verification token;
receiving, from the content verification system, a message indicating that the first interaction is a user interaction, wherein the message received from the content verification system is generated only if the content verification system confirms, based on the click verification token, that the first interaction is a user interaction.

* * * * *